US008479767B2

(12) United States Patent
Newman et al.

(10) Patent No.: US 8,479,767 B2

(45) Date of Patent: Jul. 9, 2013

(54) COMBINED FILL AND SAFETY VENT PLUG

(75) Inventors: Shmuel Dovid Newman, Redondo Beach, CA (US); Jeffrey Brown, North Logan, UT (US)

(73) Assignee: YSN Imports, Inc., Gardena, CA (US)

( * ) Notice: Subject to any disclaimer, the term of this patent is extended or adjusted under 35 U.S.C. 154(b) by 77 days.

(21) Appl. No.: 12/900,772

(22) Filed: Oct. 8, 2010

(65) Prior Publication Data

US 2011/0114208 A1 May 19, 2011

Related U.S. Application Data

(60) Provisional application No. 61/261,266, filed on Nov. 13, 2009.

(51) Int. Cl.
*F16K 24/00* (2006.01)

(52) U.S. Cl.
USPC ................................. 137/588; 222/3; 62/50.7

(58) Field of Classification Search
USPC ................ 137/588, 590; 62/50.7, 50.1; 222/3
See application file for complete search history.

(56) References Cited

U.S. PATENT DOCUMENTS

| | | | | |
|---|---|---|---|---|
| 934,037 | A * | 9/1909 | Bunin | 137/588 |
| 2,529,275 | A * | 11/1950 | Blumer et al. | 137/588 |
| 3,433,389 | A * | 3/1969 | Puster | 222/3 |
| 3,648,893 | A * | 3/1972 | Whiting | 222/3 |
| 3,747,626 | A | 7/1973 | Valentino | |
| 4,445,527 | A | 5/1984 | Leimbach | |
| 5,199,603 | A * | 4/1993 | Prescott | 222/3 |
| 5,623,964 | A | 4/1997 | Tsai | |
| 5,694,969 | A | 12/1997 | DeVuyst | |
| 5,778,923 | A | 7/1998 | Marston | |
| 6,003,547 | A * | 12/1999 | Tippmann, Jr. | 137/588 |
| 6,079,519 | A | 6/2000 | Lottes | |
| 6,257,000 | B1 | 7/2001 | Wang | |
| 7,073,527 | B1 | 7/2006 | Freire Teiga | |
| 2010/0282333 | A1 | 11/2010 | Newman et al. | |

FOREIGN PATENT DOCUMENTS

| | | | |
|---|---|---|---|
| EP | 1887276 | A2 | 2/2008 |
| KR | 10-2008-0068032 | A | 5/2007 |
| WO | 01/81822 | A1 | 11/2001 |
| WO | 2007/048955 | A1 | 3/2007 |

OTHER PUBLICATIONS

KIPO International Search Report (ISR) and Written Opinion in co-pending application PCT/US2010/056132, Jul. 28, 2011.

* cited by examiner

*Primary Examiner* — John Rivell
*Assistant Examiner* — Angelisa Hicks
(74) *Attorney, Agent, or Firm* — Lance M. Pritikin, Esq.; Bruce A. Jagger, Esq.

(57) ABSTRACT

A combined fill and safety vent plug adapted to being mounted in a port in a pressure tank. A valve housing member is adapted to being mounted in a port in a pressure vessel. A fill valve is located in a fill valve socket in the valve housing member. A vent valve and an overflow system are also provided in the valve housing member. All of the functions of filling, venting, dispensing, and overflow protection are provided by elements contained in one single plug in one single port in a pressure vessel. For safety purposes, the vent valve dumps excess fluid generally laterally of the valve housing member.

19 Claims, 3 Drawing Sheets

COMBINED FILL AND SAFETY VENT PLUG

RELATED APPLICATIONS

This application claims the benefit of U.S. Provisional Application No. 61/261,266 filed Nov. 13, 2009, the content of which is incorporated by this reference in its entirety for all purposes as if fully set forth herein.

TECHNICAL FIELD OF THE INVENTION

The present invention relates generally to the field of safety devices for the filling and venting of tanks for propane, butane, and other gases that are typically filled while at least primarily in the liquid state. More particularly, the present invention relates to valves and valve bodies in which both fill and pressure relief valves are mounted.

BACKGROUND OF THE INVENTION

Small tanks that are conveniently sized to be carried and handled by hand are often filled with propane or butane fuel, and used by consumers for cooking, heating, torches, soldering, brazing, lighting, and the like. Such small tanks have a limited capacity, so they must be refilled or replaced with some frequency. Typically, such small tanks have a capacity of less than approximately three cubic feet. Safety is a serious concern in filling and refilling such tanks. Often, safety concerns with refilling dictate that such tanks must be provided fully charged with fuel, and the valves are configured so that they can not be refilled.

Typically, the valves in such small fuel tanks include a fill valve and a pressure relief or vent valve. The fill valve is often a conventional spring biased pin valve of the type that is often described as a Schrader valve. The same general type of pin valve is also used in great numbers, for example, as filling valves for bicycle and automobile tires. The fill valve is typically spring biased into the closed configuration. The fill nozzle is designed so that it forces the fill valve open against the spring bias when the fill nozzle engages the valve. Removing the fill nozzle allows the fill valve to close. Conventional vent valves provide for the safe venting of gas from a tank when the pressure within the tank exceeds the predetermined safe pressure limit for that particular tank. Conventional vent valves include a seal that is spring biased into the closed configuration. Pressure on the tank side of the valve will overcome the spring bias and open the vent valve when the pressure in the interior of the tank exceeds the predetermined safe pressure limit. Conventional vent valves generally vent directly out of the port in a direction that is axial with respect to the longitudinal axis of the vent port in which it is mounted. This tends to expose the user that is filling the port to a direct facially-aimed blast of gas when the vent valve opens. This presents a serious safety concern.

Typical conventional small tanks have the vent valve and the fill valve in separate ports. This increases the cost and complexity of such tanks. Also, the use of two ports increases concerns about safety and quality control. Where the tank is intended to be refilled by an end user, particularly where the refilling is accomplished from a larger tank, provisions must also be made for a dip tube. Tanks, for example, should not be filled with propane to beyond approximately 80 percent of the interior volume of the tank. Propane is typically a liquid at the pressures normally encountered by an end user in filling small tanks from larger ones. Thus, the tank should not be filled with liquid propane to more than 80 percent of its interior volume. Where the tank is in the form of a right cylinder the liquid propane level is a good indication of the percentage of the tank that has been filled. For a vertically positioned right cylindrical tank, a liquid level that is located at 80 percent of the length tank is a good indication that 80 percent of the volume of the tank is filled with liquid propane. A dip tube extends from the normally uppermost side of the tank for approximately 20 percent of the length of the tank into the tank's interior. The dip tube is hollow and it is vented directly to the ambient environment so that a user can see when liquid propane starts to run out of the dip tube port. This shows the user that the tank is full, and it prevents the tank from being overfilled. The dip tube is ported to the ambient environment so the end user can see liquid that is discharged from it. There are thus three ports, namely, a vent port, a fill port, and an overflow port that must be accommodated safely, reliably and inexpensively.

Accordingly, there exists a need for a simplified fill valve-vent valve design that is safe, simple, compact, reliable, and allows for refilling of small tanks by end users without special or expensive equipment. There is a need for the combination of fill and vent valves that can be installed in one port. Where refilling capability is provided there is a need for a dip tube to be incorporated in the same port as the two valves.

SUMMARY OF THE INVENTION

In embodiments a combined fill and safety vent plug is provided that is adapted to being mounted in a port in a pressure tank. This combined fill and safety vent plug includes a valve housing member. The valve housing member has a longitudinal axis extending there through between normally exterior and interior ends of the valve housing member. The normally exterior end is located on a normally exterior portion of the valve housing member, and the normally interior end of the valve housing member being located on a normally interior portion of the valve housing member.

A vent valve socket extends within the valve housing member, and is adapted to being in fluid venting communication between an interior of a pressure tank and at least a generally laterally extending pressure relief port in the normally exterior portion of the valve housing member. A fill valve socket extends within the valve housing member. The fill valve socket is adapted to being in fluid filling communication through a port in a pressure tank with the interior of that pressure tank.

An overflow channel extends within the valve housing member. It is adapted to being in fluid overflow communication between the interior of a pressure tank and an overflow port located in the normally exterior portion of the valve housing member.

A vent valve is mounted in the vent valve socket. The vent valve is biased towards a closed configuration. It is adapted to being moved to a pressure venting configuration responsive to a predetermined amount of fluid pressure in the interior of a pressure tank.

A fill valve is mounted in the fill valve socket, the fill valve is biased towards a closed configuration. It is adapted to being moved to a filling configuration by contact with a fill nozzle. Referring to FIG. 8 for example, the fill valve 38 may preferably be disposed entirely inwardly of the normally exterior end 20.

A dip tube is mounted in fluid communication with the overflow channel. The overflow port is adapted to being open during a filling operation. The overflow port is otherwise normally closed.

In certain embodiments of a combined fill and safety vent plug the normally interior portion of the valve housing member includes external threads that are adapted to being threadably received in a port in a pressure tank. In some embodiments the overflow port opens generally laterally of the longitudinal axis of the valve housing member. In certain embodiments of the combined fill and safety vent plug the valve housing member is adapted to being welded into a pressure tank. In further embodiments the vent valve socket extends to both the normally exterior end and the laterally extending pressure relief port of a valve housing member. According to certain embodiments the valve housing member is generally cylindrical. In some embodiments the dip tube is adapted to extend into the interior of a pressure tank to a position where liquid is discharged through the dip tube when the interior of the pressure tank is filled to a predetermined capacity.

BRIEF DESCRIPTION OF THE DRAWINGS

Further advantages of the present invention may become apparent to those skilled in the art with the benefit of the following detailed description of the best presently known mode of practicing the invention, and upon reference to the accompanying drawings in which.

Figure 2:
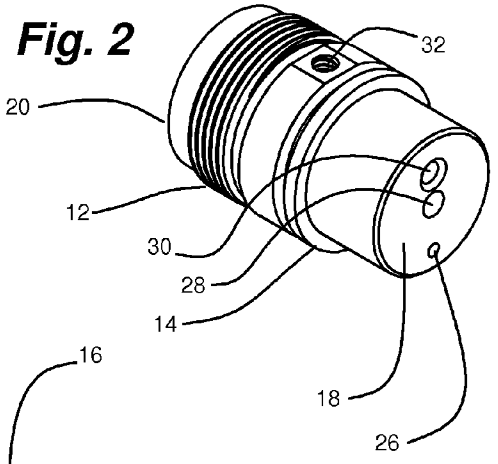
FIG. 2 is an isometric view depicting the embodiment of FIG. 1.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications.

DETAILED DESCRIPTION OF THE INVENTION

The following description of preferred embodiments generally relates to combined fill and safety vent plugs. Such plugs serve to mount at least vent and fill valves in a single port in a pressure tank. Such plugs also provide for the mounting of dip tubes, when present, in a single port.

Figure 4:
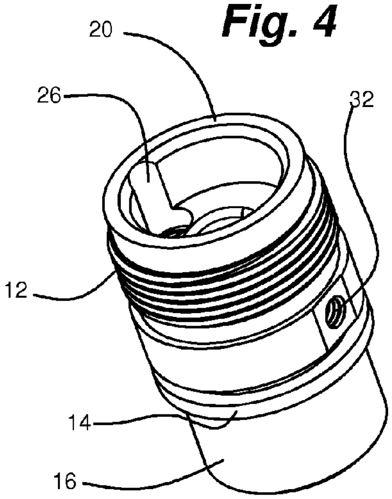
FIG. 4 is an additional isometric view depicting the embodiment of FIG. 1.
Figure 3:
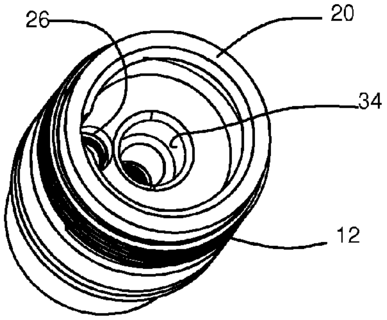
FIG. 3 is a further isometric view depicting the embodiment of FIG. 1.
Figure 5:
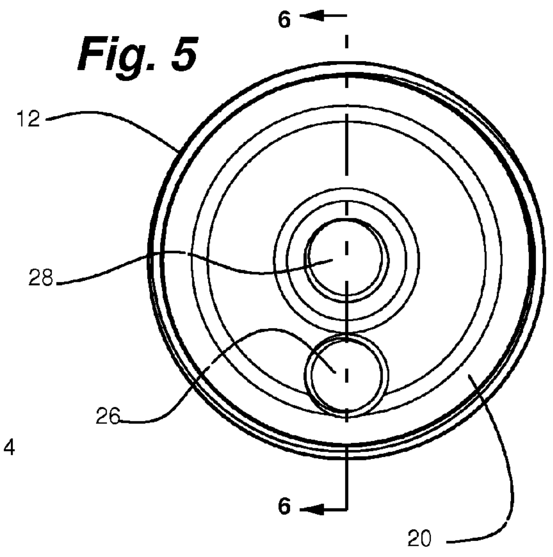
FIG. 5 is an outer end view depicting the normally exterior end of the embodiment of FIG. 1.
Figure 6:
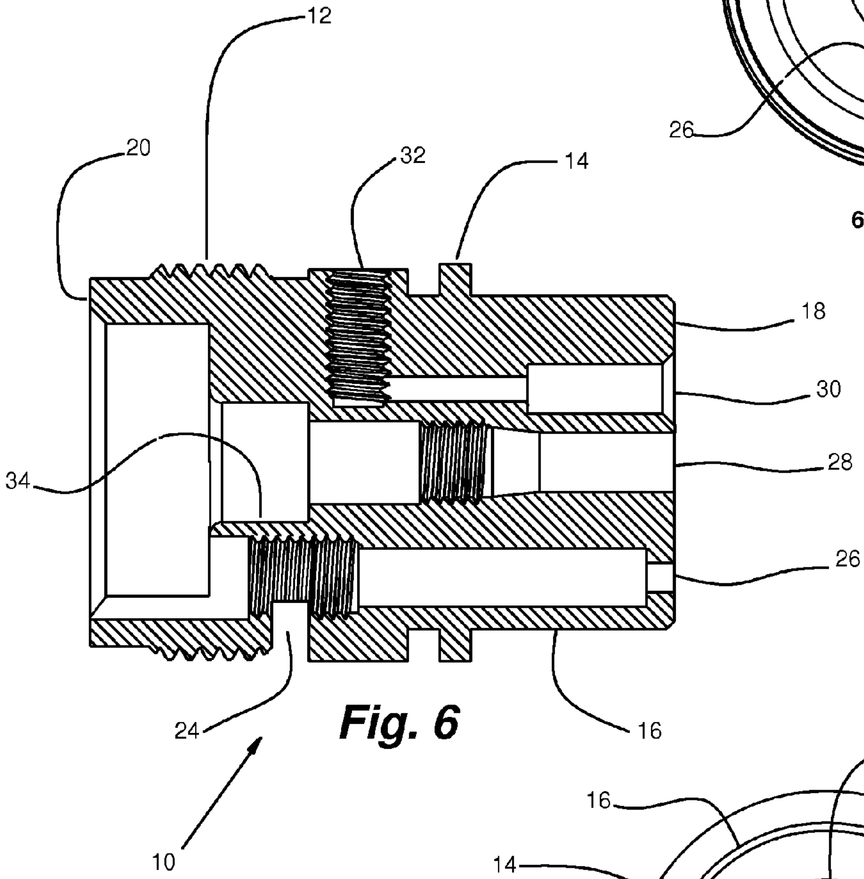
FIG. 6 is a cross-sectional view depicting the embodiment of FIG. 1 taken along line 6-6 in FIG. 5.
Figure 7:
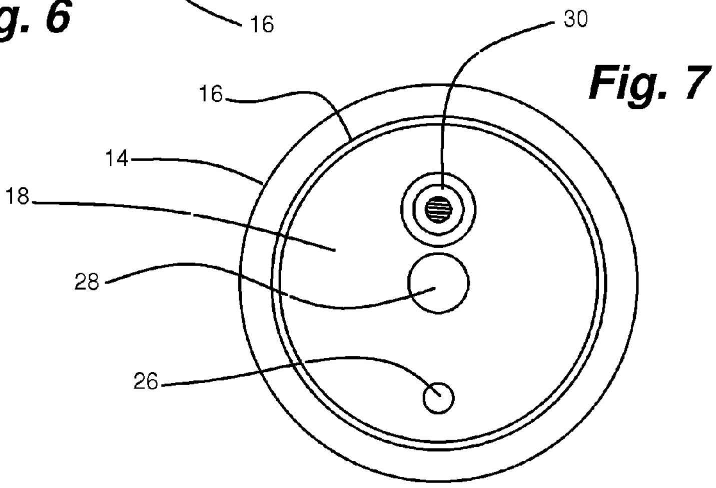
FIG. 7 is an inner end view depicting the normally interior end of the embodiment of FIG. 1.
Figure 8:
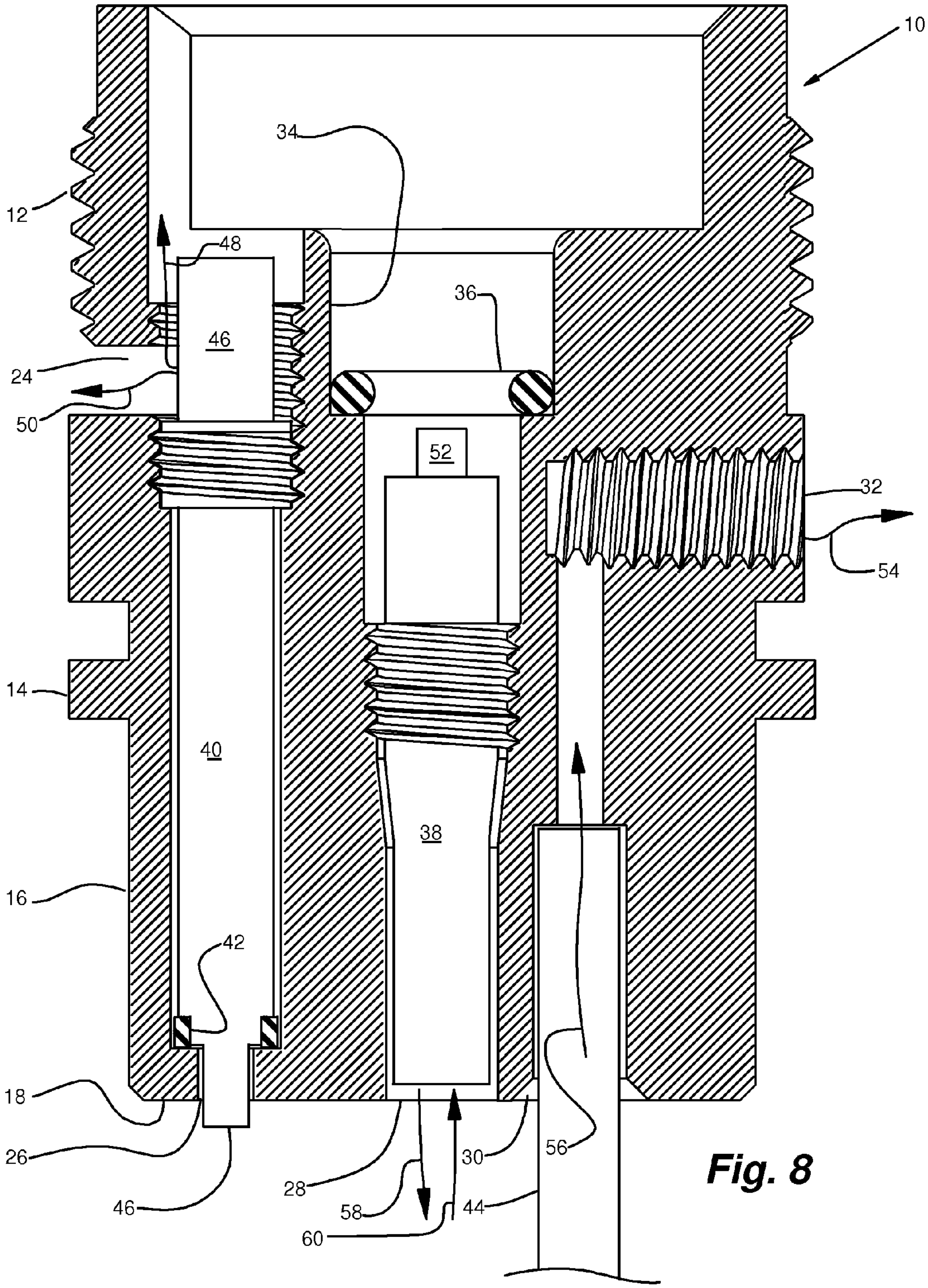
FIG. 8 is a cross-sectional view of a combination plug and valves depicting the embodiment of FIG. 1 with a vent valve, a fill valve, and a dip tube installed.

With particular reference to the figures, there is indicated generally at 10 a valve housing member 10. As illustrated in FIGS. 2, 3 and 4 for example, valve housing member 10 may be generally cylindrical along its entire length. Valve housing member 10 is specially configured to mount a vent valve 40 in a vent valve socket 26, a fill valve 38 in a fill valve socket 28, and a dip tube 44 in an overflow channel 30. As illustrated in FIG. 8 for example, a fill valve socket 28 may extend axially within the valve housing member 10. When certain embodiments are operatively sealingly joined to a mating port in a pressure vessel (not shown) the functions of filling (indicated by fluid flow arrow 58), venting (indicated by fluid flow arrows 48 and 50), dispensing, (indicated by fluid flow arrow 60), and overfill prevention (see fluid flow arrows 54 and 56) are all incorporated into a single plug mounted in a single port. These functions are performed in such a way as to provide safe, simple, and easy filling, use, and refilling of pressure vessels. When used to dispense pressurized fluid for heating or other purposes, the device that consumes the dispensed fluid is typically sealingly joined through external thread 12 to the pressure vessel that holds the fluid. Fluid flow arrow 60 indicates the flow of fluid outwardly through fill valve 38 in response to the opening of this valve (depression of fill valve opening pin 52) by a connection to a device (not shown). As illustrated in FIGS. 6 and 8 for example, the fill valve socket 28 may be adapted to threadedly engage the fill valve 38, and the vent valve socket 26 may be adapted to threadedly engage the vent valve 40.

Valve housing member 10 has a generally right cylindrical configuration according to certain embodiments. A longitudinal axis 21 extends through the valve housing member 10 from normally external end 20 to normally internal end 18. Valve housing member 10 includes an external thread 12 on external portion 22. External thread 12 is adapted to threadably mate with a connection to a device that uses the fluid that is confined in an associated pressure vessel. If desired, external thread 12 may also threadably mate with a fill nozzle (not shown), although such a connection with a fill nozzle is often not used. Annular boss 14 serves to limit the depth to which valve housing member 10 may be inserted into a conventional port (not shown) in a conventional pressure vessel (not shown). In embodiments where outer surface 16 of normally interior portion 19 is not threaded, annular boss 14 provides a convenient location for a weld to sealingly join valve housing member 10 to a mating annular wall of an annular port in a pressure tank (not shown). For thread bearing embodiments, annular boss 14 serves as a convenient location for a seal to seal valve housing member 10 to the mating annular end wall of a port.

The functions of filling, venting, use, and overfill protection in certain embodiments all involve fluid communication through valve housing member 10. Filling involves fluid communication into the interior of a closed pressure vessel from an external source by way of a nozzle (not shown) mated with the exterior portion 22 of valve housing member 10. The nozzle seals to valve housing member 10 upon being inserted into the normally external portion 22 of valve housing member 10 by sealingly engaging annular seal 36. Seal 36 is confined in fill valve socket 28 by generally annular wall 34 and an adjacent radially inwardly projecting boss. The nozzle pushes against fill valve opening pin 52 to overcome a spring bias that holds fill valve 38 in the closed configuration. This opens fill valve 38. Fluid (either liquid or gas) is then free to flow from an exterior source through the nozzle, through fill valve 38, and into the interior of a pressure vessel. Fill valves suitable for use according to the present invention are conventionally available. Fill valve 38 is only indicated diagrammatically in FIG. 8 so that certain other aspects of the invention may be more clearly illustrated.

Particularly in those embodiments that are intended to be employed in the refilling of pressure tanks, and in other embodiments as well, overfill protection is provided by opening overflow port 32 during a filling operation. In those embodiments where dip tube 44 is inserted into overflow channel 30 and projects downwardly into the interior of a pressure vessel for a predetermined distance, the overflow of liquid out of the interior of a pressure tank, as indicated at 56, and out of overflow port 32 as indicated at 54 indicates to the operator of the filling operation that a full condition exists. The overflow of liquid out of overflow port 32, as indicated at 54, also automatically prevents overfilling.

In those embodiments where overflow protection is provided, venting during filling is provided by overflow out of overflow port 32. In those embodiments where overflow protection is not provided, safety concerns require the presence of a vent system that will be forced open by an amount of pressure within a pressurized tank that exceeds a predetermined amount. Also, all pressurized tanks should have a pressure vent system that will dump excess pressure out of the tank. When overflow port 32 is closed, for example, by a plug (not shown) it is necessary for safety purposes to have a pressure activated vent system.

Figure 1:
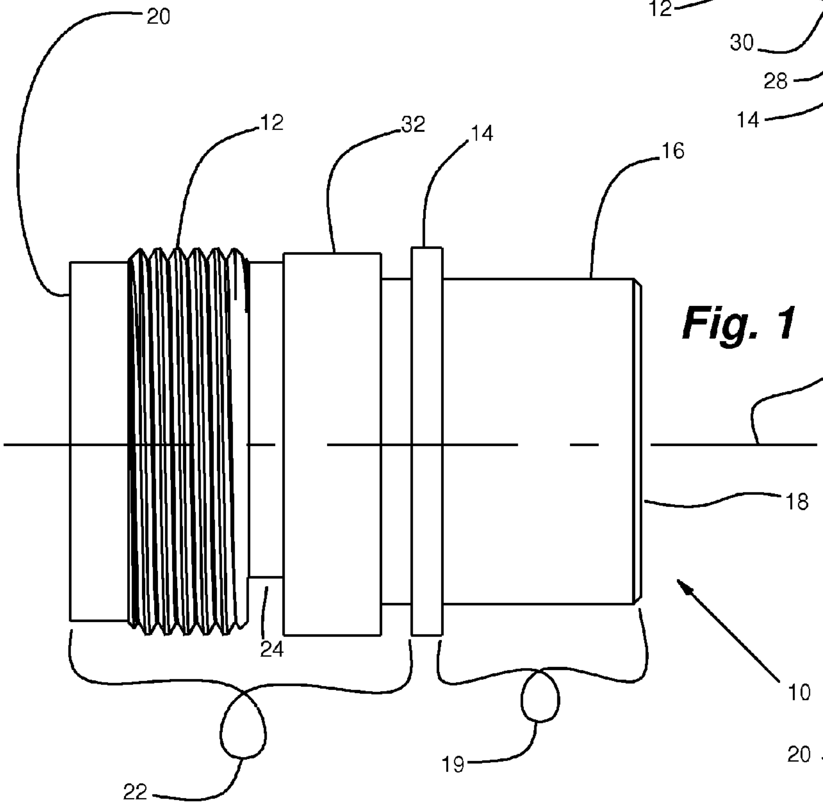
FIG. 1 is a side view depicting an embodiment of a plug for mounting a vent valve, a fill valve, and a dip tube in a single port in a pressurized tank.

Venting, according to certain embodiments, is accomplished by providing a vent valve 40. Vent valves suitable for use according to the present invention are conventionally available. Vent valve 40 is only indicated diagrammatically in FIG. 8 so that certain other aspects of the invention may be more clearly illustrated. As illustrated in FIGS. 1 and 8 for example, the vent valve socket 26 may extend parallel to the longitudinal axis 21. Vent valve 40 is spring biased so that seal 42 sealing engages the wall of vent valve socket 26 unless fluid pressure on the face 46 of vent valve 40 is sufficient to overcome the spring bias. When seal 42 is disengaged from its mating surface, fluid escapes through head 46 and flows at least out of generally laterally extending pressure relief port 24 as indicated by fluid flow arrow 50. Fluid that flows out of this generally laterally extending pressure relief port 24 is generally dissipated along the exterior surface of the pressurized tank where it was stored. In those configurations where normally exterior end 20 is not closed by some threaded connection or otherwise, vented fluid may also flow outwardly through normally exterior end 20 as indicated by fluid flow arrow 48. For safety's sake, it is generally desirable to dissipate as much fluid as possible along the generally lateral direction as indicated by fluid flow arrow 50. As would be understood from viewing the embodiment depicted FIG. 8 for example, opening the overflow port 32 would not require the spring bias of the vent valve 40 to be overcome. Put another way, opening the overflow port 32 does not require movement of the vent valve 40 toward its pressure venting configuration. As would further be understood by FIG. 8, embodiments may exist in which no dip tube is disposed in fluid communication between the interior of the tank (not shown) and the vent valve 40.

The foregoing detailed description of the invention is intended to be illustrative and not intended to limit the scope of the invention. Changes and modifications are possible with respect to the foregoing description, and it is understood that the invention may be practiced otherwise than that specifically described herein and still be within the scope of the claims.

What is claimed is:

1. A combined fill and safety vent plug adapted to being mounted in a port in a pressure tank, said combined fill and safety vent plug comprising:

a valve housing member having a longitudinal axis extending there through between a normally exterior end and a normally interior end of said valve housing member, said normally exterior end being located on a normally exterior portion of said valve housing member, and said normally interior end of said valve housing member being located on a normally interior portion of said valve housing member;

a vent valve socket extending parallel to said longitudinal axis within said valve housing member and adapted to being in fluid venting communication between an interior of said pressure tank and at least a generally laterally extending pressure relief port in said normally exterior portion;

a fill valve socket extending axially within said valve housing member and adapted to being in fluid filling communication through said port with said interior of said pressure tank;

an overflow channel extending within said valve housing member and adapted to being in fluid overflow communication between said interior of said pressure tank and an overflow port in said normally exterior portion;

a vent valve mounted in said vent valve socket, said vent valve being spring biased towards a closed configuration and adapted to being moved to a pressure venting configuration responsive to a predetermined amount of fluid pressure in said interior of said pressure tank;

a fill valve mounted in said fill valve socket, said fill valve being biased towards a closed configuration and adapted to being moved to a filling configuration by contact with a fill nozzle; and a dip tube mounted in fluid communication with said overflow channel, said overflow port adapted to being open during a filling operation and otherwise normally closed;

wherein opening said overflow port does not require said spring bias to be overcome.

2. A combined fill and safety vent plug of claim 1 wherein said normally interior portion includes external threads that are adapted to be threadably received in said port.

3. A combined fill and safety vent plug of claim 1 wherein said overflow port opens generally laterally of said longitudinal axis.

4. A combined fill and safety vent plug of claim 1 wherein said valve housing member is adapted to being welded into said pressure tank.

5. A combined fill and safety vent plug of claim 1 wherein said vent valve socket extends to both said normally exterior end and said laterally extending pressure relief port.

6. A combined fill and safety vent plug of claim 1 wherein said valve housing member is generally cylindrical along its entire length.

7. A combined fill and safety vent plug of claim 1 wherein said dip tube is adapted to extend into said interior of said pressure tank to a position where liquid is discharged through said dip tube when said interior of said pressure tank is filled to a predetermined capacity.

8. A combined fill and safety vent plug of claim 7 wherein no dip tube is disposed in fluid communication between said interior and said vent valve.

9. A combined fill and safety vent plug of claim 1 wherein said fill valve socket is adapted to threadedly engage said fill valve and said vent valve socket is adapted to threadedly engage said vent valve.

10. A combined fill and safety vent plug of claim 1 further comprising an annular seal confined in said fill valve socket, said valve housing member being adapted to axially receive said fill nozzle along said longitudinal axis for sealing said fill nozzle to said valve housing member by way of said annular seal.

11. A combined fill and safety vent plug adapted to being mounted in a port in a pressure tank, said combined fill and safety vent plug comprising:

a valve housing member having a longitudinal axis extending there through between a normally exterior end and a normally interior end of said valve housing member, said normally exterior end being located on a normally exterior portion of said valve housing member, and said normally interior end of said valve housing member being located on a normally interior portion of said valve housing member;

a vent valve socket extending parallel to said longitudinal axis within said valve housing member and adapted to being in fluid venting communication between an interior of said pressure tank and at least a generally laterally extending pressure relief port in said normally exterior portion;

a fill valve socket extending axially within said valve housing member and adapted to being in fluid filling communication through said port with said interior of said pressure tank;

an overflow channel extending within said valve housing member and adapted to being in fluid overflow communication between said interior of said pressure tank and an overflow port in said normally exterior portion;

a vent valve mounted in said vent valve socket, said vent valve being biased towards a closed configuration and adapted to being moved to a pressure venting configuration responsive to a predetermined amount of fluid pressure in said interior of said pressure tank;

a fill valve mounted in said fill valve socket, said fill valve being spring biased towards a closed configuration and adapted to being moved to a filling configuration by contact with a fill nozzle, said fill valve being disposed entirely inwardly of said normally exterior end; and a dip tube mounted in fluid communication with said overflow channel, said overflow port adapted to being open during a filling operation and otherwise normally closed;

wherein opening said overflow port does not require movement of said vent valve toward its pressure venting configuration.

12. A combined fill and safety vent plug of claim 11 wherein said overflow port opens generally laterally of said longitudinal axis.

13. A combined fill and safety vent plug of claim 11 wherein said vent valve socket extends to both said normally exterior end and said laterally extending pressure relief port.

14. A combined fill and safety vent plug of claim 11 wherein said valve housing member is generally cylindrical along its entire length.

15. A combined fill and safety vent plug of claim 11 wherein said dip tube is adapted to extend into said interior of said pressure tank to a position where liquid is discharged through said dip tube when said interior of said pressure tank is filled to a predetermined capacity.

16. A combined fill and safety vent plug of claim 15 wherein no dip tube is disposed in fluid communication between said interior and said vent valve.

17. A combined fill and safety vent plug of claim 11 wherein said dip tube is adapted to extend into said interior of said pressure tank from a normally uppermost side of said pressure tank for approximately 20 percent of the length of said pressure tank.

18. A combined fill and safety vent plug of claim 11 wherein said fill valve socket is adapted to threadedly engage said fill valve and said vent valve socket is adapted to threadedly engage said vent valve.

19. A combined fill and safety vent plug of claim 11 further comprising an annular seal confined in said fill valve socket, said valve housing member being adapted to axially receive said fill nozzle along said longitudinal axis for sealing said fill nozzle to said valve housing member by way of said annular seal.

* * * * *